No. 679,471. Patented July 30, 1901.
J. F. BYERS.
MOTOR VEHICLE CONSTRUCTION.
(Application filed Nov. 5, 1900.)
(No Model.) 2 Sheets—Sheet 1.
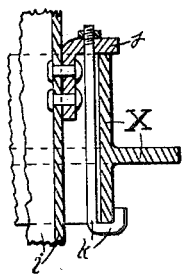
Fig. 8.
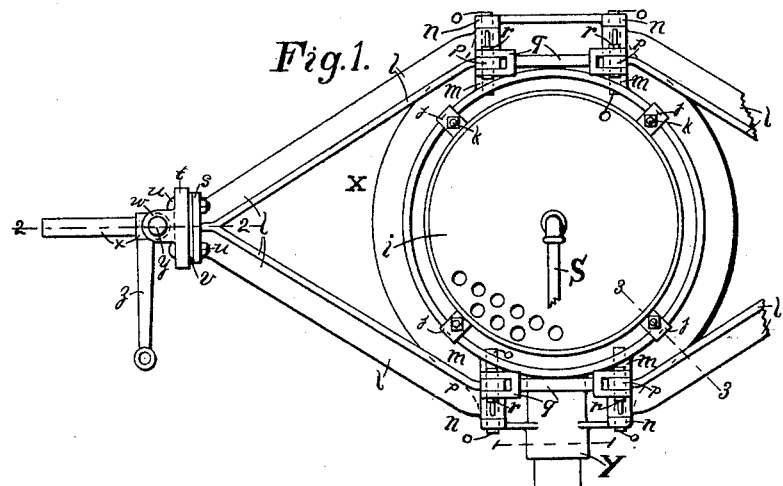
Fig. 1.
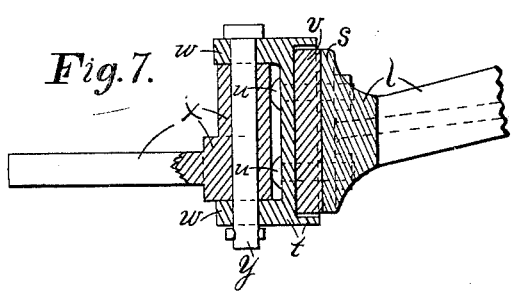
Fig. 7.
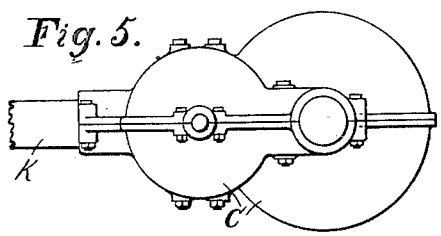
Fig. 5.
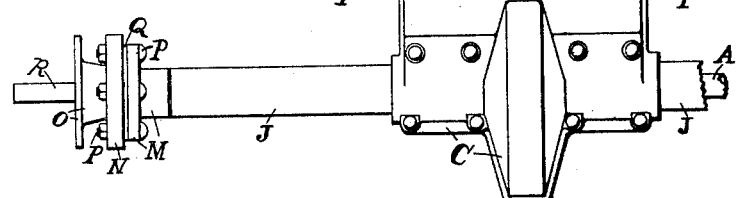
Witnesses:
John N. Barber.
E. H. Rickerson.
Inventor.
John F. Byers.
Per E. N. Barber, Atty.

No. 679,471. Patented July 30, 1901.
J. F. BYERS.
MOTOR VEHICLE CONSTRUCTION.
(Application filed Nov. 5, 1900.)
(No Model.) 2 Sheets—Sheet 2.
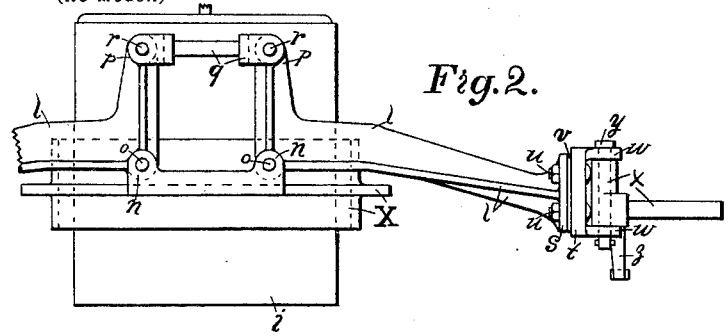
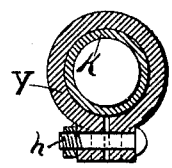
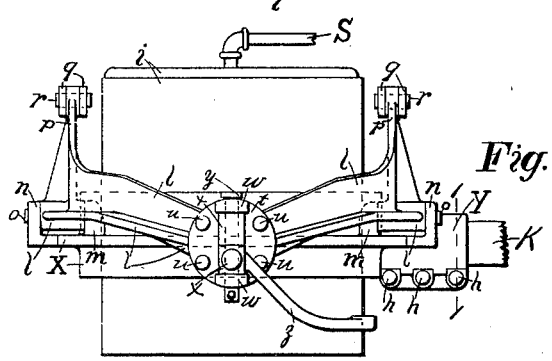
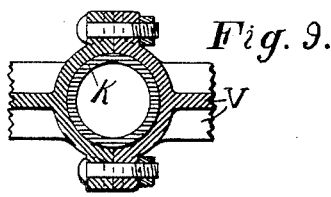
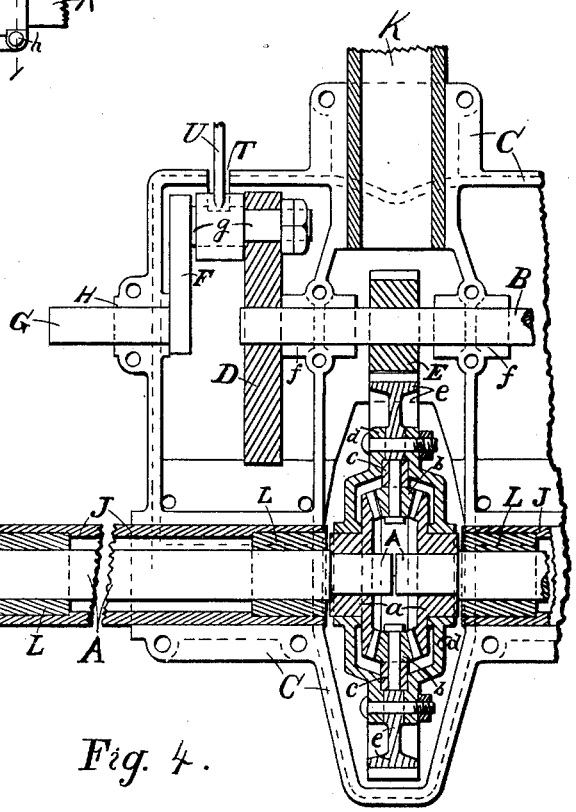
Witnesses.
John N. Barber.
E. H. Rickerson.
Inventor.
John F. Byers.
Per E. N. Barber. atty.

UNITED STATES PATENT OFFICE.

JOHN F. BYERS, OF RAVENNA, OHIO.

MOTOR-VEHICLE CONSTRUCTION.

SPECIFICATION forming part of Letters Patent No. 679,471, dated July 30, 1901.

Application filed November 5, 1900. Serial No. 35,436. (No model.)

*To all whom it may concern:*

Be it known that I, JOHN F. BYERS, a citizen of the United States, residing at Ravenna, in the county of Portage and State of Ohio, have invented a new and useful Motor-Vehicle Construction, of which the following is a specification.

My invention relates to improvements in the construction of motor-vehicles, in which the motor and steam-boiler are attached to the frame or "running-gear" instead of to the "body" of the vehicle; and the objects of my invention are, first, to provide for carrying the weight of the boiler by the front or steering wheels with its lower end below the level of the wheel-centers, thus distributing the entire weight more equally on all the wheels, making the boiler easily accessible, and locating its center of gravity low down; second, to also provide a running-gear-frame construction that allows the wheels to conform to an irregular road-surface; third, to provide for intercepting and absorbing vibrations and jars caused by unevenness of the road-surface, and, fourth, to provide a neat and strong running-gear-frame structure in which the driving-axles, compensating and driving gears, cranks, and crank-shaft are completely incased. I attain these objects by the mechanism, construction, and arrangement illustrated in the accompanying drawings, in which—

Figure 1 is a partial plan view of the running-gear frame, motor, boiler, &c.; Fig. 2, a partial front elevation of the front end; Fig. 3, a partial side elevation of the front end; Fig. 4, an enlarged sectional plan view of a part of the rear end on a horizontal plane passing through the centers of the parts shown with the top half of the gear-casing removed; Fig. 5, a side elevation of the gear-casing; Fig. 6, an enlarged vertical sectional elevation on the line 1 1 of Fig. 3; Fig. 7, an enlarged vertical sectional elevation on the line 2 2 of Fig. 1; Fig. 8, an enlarged partial section on the line 3 3 of Fig. 1, and Fig. 9 an enlarged partial section on the line 4 4 of Fig. 1.

Like letters refer to like parts in the several views.

The rear or driving axles or shafts A A are connected by the usual compensating gearing, of which the two bevel-gears *a a* are made fast to their respective adjacent ends of the driving-shafts A A, and the connecting-gears *b b*, each in mesh with both of the gears *a a*, are pivotally attached to the carrier-ring *c*, secured between the bearing-plates *d d*, having bearings at their centers on the respective hubs of the gears *a a*. Between the bearing-plates *d d* and rigidly connected thereto is the web of the main transmitting-gear *e*.

B is the crank-shaft, having bearings *f f* in the gear-casing C, and to each end of which shaft is rigidly secured a crank-disk D and at its center the driving-gear E in mesh with gear *e*. There are two crank or wrist pins *g*. They are integral parts of the return-crank extensions F, project at right angles therefrom, and are so secured to their respective crank-disks D that one rotates in advance of the other ninety degrees. Each return-crank extension F has a shaft end G, with a bearing H in the gear-casing G, thus forming an extension of the crank-shaft for carrying the eccentrics I I. The crank-disks D may of course be omitted and the cranks formed integral with the shaft.

There are two duplicate parts forming the gear-casing C, of such form that when bolted together, as shown in Figs. 1 and 5, they completely incase all gears, cranks, and crank-disks, incase and form bearings for the crank-shaft, and are rigidly clamped to one end of each of the tubular extensions J J and to one end of the tubular reach K. Each tubular extension J is provided with two bearings L L for its driving-shaft A. The driving-shafts are thus completely incased.

There are two driving-collars M, each rigid on the outer end of their respective driving-shafts A and each secured to a special driving-flange N of a driving-wheel hub-band O by bolts P. Between each of the special driving-flanges N and its driving-collar M is a rubber disk Q.

Of the driving-wheels only one of the inside hub-bands is shown. These hub-bands each have a center hole, through which a center bolt R passes and extends outward through the hub of the wheel. The heads R' of the center bolts R are larger than the openings through the centers of the hub-bands and extend through the rubber disks and have bearings in the centers of their respective driving-collars M. These center bolts may be omitted by making the other parts and fastenings sufficiently strong.

There are openings T T in the casing C to allow the connecting-rods U U to operate the crank-shaft.

Of the motor the two double-acting steam-cylinders V V, together with their respective cross-head guides W W, are properly formed to be bolted together with the reach K between them and be thus rigidly secured together and to the reach, as shown.

X is a boiler-frame, in plan a flanged ring, and at one side is formed with a clamp-socket extension Y, by which with the clamp-bolts $h$ it is attached to the front end of the reach K. The boiler $i$ is supported within and by the boiler-frame X and is secured thereto by the angle-irons $j$, secured to the boiler-shell, and the hook-bolts $k$, as shown in Fig. 8. The steering-wheel axle is formed principally of the two duplicate members $l\ l$, bifurcated to near their outer or wheel spindle ends, thus each forming two diverging branches, as seen in plan view, Fig. 1, terminating in bell-crank ends, as shown in Figs. 2 and 3. The bell-crank branches of the axle members $l\ l$ are all pivoted at their fulcrums between lugs $m$, projecting outward from the boiler-frame X, and lugs $n$, projecting upward from the outer extremity of the horizontal flange member of the boiler-frame, where they are held by the fulcrum-pins $o$. The top ends $p$ of the short arms of the bell-crank branches of one axle member are connected to the opposing like parts of the other axle member by the connectors $q$, between the bifurcated ends of which their ends $p$ are pivoted and held by the pivot-pins $r$. This construction of boiler-frame and axle permits locating the boiler low down and also permits the wheels to easily conform to an uneven road-surface.

At the outer end of each of the axle members $l\ l$ is formed a coupling-disk $s$, to which is secured a pivot-disk $t$ by bolts $u$. Between each coupling end $s$ and its pivot-disk $t$ is a disk of rubber $v$, through which the bolts $u$ pass.

All the elastic disks interposed between the wheels and the main part of the running-gear frame are for the purpose of intercepting and absorbing vibrations and jars caused by an uneven road-surface.

Between the two ears $w\ w$ of each of the two pivot-disks $t$ is pivoted a steering-wheel-spindle member $x$, held by a pivot-bolt $y$, on which the spindle member is turned by its steering-arm $z$.

The steering-wheels of the vehicle turn on the spindles $x$, and a body may be attached to the tubular casings J and the reach.

S is a steam-pipe connecting the boiler and motor.

The rotary motion given the crank-shaft by the motor is transmitted to driving-wheels by and through their connected hub-bands, driving-collars, driving-shafts, compensating gears, and gears $e$ and E. The gas-engine type of motor may be used with this driving-end construction and may be secured to the reach in the manner shown.

A single driving-shaft may be used instead of the divided one A A, in which case the compensating gearing would be omitted and the gear $e$ would be secured directly to the single driving-shaft. In the following claims the driving-shaft referred to in the singular number means either form, the single or the divided.

What I claim as my invention, and desire to secure by Letters Patent, is—

1. In a motor-vehicle running-gear frame, two tubular driving-shaft casings and a reach member, in combination with a gear-casing in two parts; said parts clamped to the shaft-casings and reach member by the fastenings that secure them together, substantially as set forth.

2. In a motor-vehicle, two tubular driving-shaft casings, a reach member connected to the steering end of a running-gear, and a gear-casing in two parts clamped to the shaft-casings and reach member by the fastenings that secure said casing parts together, in combination with a driving-shaft connected to operate driving-wheels and having bearings in said shaft-casings, a crank-shaft having bearings in said gear-casing and connected to operate the driving-shaft, and a motor connected to operate the crank-shaft, substantially as shown and described.

3. In a motor-vehicle, a gear-casing having driving-shaft-casing extensions, a boiler-frame connected to be supported by steering-wheel-spindle members, a reach member connecting the boiler-frame and gear-casing, and a boiler secured to said boiler-frame, in combination with a driving-shaft operatively connected to driving-wheels and having bearings in said casing extensions, and a steam-motor connected to operate the driving-shaft and having steam connection with said boiler, substantially as set forth.

4. In a motor-vehicle, a gear-casing having tubular driving-shaft-casing extensions, a boiler-frame, a reach member connecting the gear-casing and boiler-frame, a boiler supported by the boiler-frame, two axle members pivoted to said boiler-frame and each secured to a steering-wheel-spindle member, and two axle-member connectors pivoted to the axle members, in combination with a driving-shaft having bearings in said casing extensions and connected to operate driving-wheels, and a steam-motor connected to operate the driving-shaft and having steam connection with said boiler, substantially as shown and described.

5. In a steam-motor vehicle, a boiler-frame connected to be supported by steering-wheel-spindle members, in combination with a boiler encircled by and secured to the boiler-frame, and a reach member connecting the boiler-frame to the driving-shaft end of a running-gear frame, substantially as set forth.

6. In a steam-motor vehicle, a boiler-frame and a boiler secured to said boiler-frame, in combination with two axle members pivoted to the boiler-frame and each secured to a steering-wheel-spindle member, two axle-member connectors pivoted to the axle members, and a reach member connecting the boiler-frame to the driving-shaft end of a running-gear frame, substantially as shown and described.

JOHN F. BYERS.

Witnesses:
H. B. DICKINSON,
E. N. BARBER.